(12) United States Patent
Page

(10) Patent No.: US 7,416,127 B2
(45) Date of Patent: Aug. 26, 2008

(54) RANGE-FINDING SYSTEM FOR A PORTABLE IMAGE READER

(75) Inventor: Harry Page, Almonte (CA)

(73) Assignee: Psion Teklogix Systems Inc., Mississauga, Ontario (CA)

( * ) Notice: Subject to any disclaimer, the term of this patent is extended or adjusted under 35 U.S.C. 154(b) by 361 days.

(21) Appl. No.: 11/066,129

(22) Filed: Feb. 24, 2005

(65) Prior Publication Data

US 2006/0186205 A1    Aug. 24, 2006

(51) Int. Cl.
*G06K 7/10* (2006.01)

(52) U.S. Cl. .............................. 235/462.45; 235/462.2; 235/462.22

(58) Field of Classification Search ............ 235/462.08, 235/462.2, 462.22, 462.23, 462.24, 462.45
See application file for complete search history.

(56) References Cited

U.S. PATENT DOCUMENTS

| | | | |
|---|---|---|---|
| 4,877,949 A | 10/1989 | Danielson et al. |
| 5,216,230 A | 6/1993 | Nakazawa |
| 5,420,411 A | 5/1995 | Salatto, Jr. et al. |
| 5,576,529 A | 11/1996 | Koenck et al. |
| 5,665,956 A | 9/1997 | La et al. |
| 5,668,364 A | 9/1997 | Swartz et al. |
| 5,773,811 A | 6/1998 | Schramm, Jr. et al. |
| 5,837,987 A | 11/1998 | Koenck et al. |
| 5,902,988 A | 5/1999 | Durbin |
| 5,925,871 A * | 7/1999 | Knowles et al. ........ 235/462.45 |
| 6,000,617 A | 12/1999 | Swartz et al. |
| 6,138,915 A | 10/2000 | Danielson et al. |
| 6,206,288 B1 | 3/2001 | May et al. |
| 6,398,112 B1 | 6/2002 | Li et al. |
| 6,595,420 B1 | 7/2003 | Wilz, Sr. et al. |
| 6,634,554 B1 | 10/2003 | Merchant |

\* cited by examiner

*Primary Examiner*—Karl D. Frech
(74) *Attorney, Agent, or Firm*—Pearne & Gordon LLP

(57) ABSTRACT

A range-finding system for a portable image reader is described. The range-finding system uses a distance-measuring device, such as an ultrasonic transducer, to determine the distance between the reader and a target, such as a label containing a bar code. An operator receives a visual indication which will assist in positioning the image reader within the optimal reading range of the target. The visual indicator may include three LED's of different color or with different blinking rates which will indicate to the operator that the reader is short, long or in the optimal reading range of the reader. In one embodiment, the reader would automatically cycle through an image acquisition or decode sequence when range finder detects that the target is within the optimal reading range of the reader. In another embodiment, the visual indicator will prompt the operator to manually trigger the image acquisition or decode sequence once the reader is positioned within the optimal reading range.

17 Claims, 6 Drawing Sheets

RANGE-FINDING SYSTEM FOR A PORTABLE IMAGE READER

FIELD OF INVENTION

The present invention relates to portable image readers such as barcode readers and more specifically to a range-finding system a portable image reader with.

BACKGROUND OF THE INVENTION

Image reading devices of the type that have optimal imaging distances, include a targeting scheme of some kind for aligning the image reader to the target, to be able to position the image reading device at an optimal imaging distance from the target. Most of these techniques project a pattern onto the target from a targeting light source. An aperture and light shaping optics are often used to project a pattern onto the target as an aid to the human operator to correctly position the image reader based on the targeting pattern.

The operator moves the image reader until targeting lines or dots converge at a predefined point, which relates to the point at which an acceptable image can be acquired. An acceptable image may be defined as one that contains sufficient resolution for post-processing. With this method, if the initial operating position is not correct it may be difficult for the operator to determine which direction the device must be moved in order to get into range. Further, with this method, the operator will perceive that he can only capture an image at the predetermined distance at which the lines or dots converge, even though an acceptable image could potentially be acquired some distance before or beyond that point. Another drawback to these methods is that it is often difficult to determine which direction the device must be moved in relation to the target.

There are also techniques which use laser diodes to project a crisp, sharp pattern onto the target; however, these methods also do not provide the user with intuitive alignment information with regard to the direction to move the device to place it at the appropriate distance from the target.

The techniques described above are passive in that they provide an indication of where the unit is being aimed but do not either initiate an image capture sequence or provide indication to the operator as to when an image capture sequence should be undertaken.

U.S. Pat. No. 5,668,364, which issued to Swartz et al on Sep. 16, 1997, discloses a target finding technique which uses an ultrasonic transducer to determine an optimal working distance from the target relative to the device. The disclosed technique however, is limited to portable laser scanners, and does not disclose a use with other electro-optical devices such as bar code or image readers which use an imaging engine. Further, the invention relates to an advisory function whereby an operator hears a beep or series of beeps. The auditory notification prompts the operator to manually activate the trigger mechanism in order to begin the decode sequence.

The beeping generated by these systems may be an annoyance to other people working in close proximity to the device. Further, in environments with a significant amount of ambient noise, such as in a warehouse or manufacturing facility, it may be difficult for the operator to hear the auditory prompts.

U.S. Pat. No. 6,138,915, which issued to Danielson et al on Oct. 31, 2000, discloses an instant barcode reader, including an auto-focusing technique which uses an ultrasonic transducer to determine an optimal focal distance. The transducer drives distance measurement circuitry which controls a solenoid attached to a lens assembly. The lens is moved to achieve an optimal focal distance from the target. The method also inhibits the automatic control of the lens assembly when the target is not within an acceptable reading range of the reader. An audio-visual status system is used to provide status information to a human operator, such that a red LED is illuminated to indicate that the reader is out of range of the target, and a green LED indicates a successful image acquire has occurred. Beeps or a series of beeps are also used to indicate the status of the device. This method requires a solenoid and moveable lens assembly, making it impractical for applications where space and cost are a major consideration. Further, the audio-visual verification means does not provide the human operator with intuitive information regarding which direction to move the reader, in order to achieve an optimal reading distance from the target.

Therefore there is a need for a portable image reader with a cost effective system of targeting a symbology, wherein a practical notification is provided to enable the operator to position the reader within an optimal reading range of the target.

SUMMARY OF THE INVENTION

The invention is directed to a range-finding system for a portable image reader comprising a distance measuring device to measure the distance of the portable image reader from a target, and a memory for storing values representing at least one optimal range of optimal reading distances from the target for the image reader. A processor is adapted to compare the measured distance to the optimal range of optimal reading distance values to determine whether the measured distance is within the optimal range, short of the optimal range or long of the optimal range. A visual indicator is coupled to the processor and provides an operator a visual signal indicating that the reader is at a distance from the target within the optimal range, short of the optimal range or long of the optimal range. The processor is further adapted to trigger an image acquisition cycle by the image reader to capture an image of the target when the reader is at a distance from the target within the optimal range.

In accordance with one aspect of the invention, the processor automatically triggers the image acquisition cycle when the reader is at a distance from the target within the optimal range.

In accordance with another aspect of the invention, the range-finding system includes an interface coupled to the processor and operable by an operator to initiate the triggering of the image acquisition cycle at any time selected by the operator or only when the reader is at a distance from the target within the optimal range.

In accordance with a further aspect of the invention, the memory in the range-finding system stores values representing a number of ranges of optimal reading distances from the target for a number of different applications for the image reader, and the range-finding system includes an interface coupled to the processor and operable by the operator to select a desired range from the ranges of optimal reading distances.

In accordance with a specific aspect of the invention, the distance measuring device comprises an ultrasonic transducer.

In accordance with another aspect of the invention, the visual indicator comprises three light sources, a first light source adapted to illuminate when the reader is at a distance from the target long of the optimal range, a second light source adapted to illuminate when the reader is at a distance from the target within the optimal range, and a third light source adapted to illuminate when the reader is at a distance from the target short of the optimal range. The light sources may each display a different color light, or they may each blink at a different rate.

In accordance with another aspect of this invention the visual indicator comprises a light source, wherein the light source is adapted to blink at a first rate when the reader is at a distance from the target long of the optimal range, adapted to blink at a second rate when the reader is at a distance from the target within the optimal range, and adapted to blink at a third rate when the reader is at a distance from the target short of the optimal range.

In accordance with a further aspect of this invention, the portable image reader is adapted to read a bar code symbol. It is another advantage of the present invention to provide a portable image reader with a visual notification system to intuitively guide the operator to align the reader to within an optimal reading distance from the target.

The invention is further directed to a method of operating a portable image-reader. The method includes positioning the image reader before a target, measuring the distance of the portable image reader from the target and comparing the measured distance with an optimal range of reading distances from the target. A first visual indication is provided when the measured distance is within the optimal range, which prompts the triggering of an image acquisition cycle by the image. Alternately, a further visual indication is provided when the measured distance is not within the optimal range, which prompts the operator to move the portable image reader towards a position within the optimal range. The process is repeated until the image acquisition cycle by the image reader is triggered.

In accordance with another aspect of the invention, the further visual indication provided includes a second visual indication when the measured distance is long of the optimal range, or a third visual indication when the measured distance is short of the optimal range. As a result of the visual indications, the operator is prompted to move the portable image reader closer to the target when the second visual indication is provided or to move the portable image reader away from the target when the third visual indication is provided.

In accordance with a further aspect of the invention, the optimal range of reading distances is selected from a number of possible optimal ranges for the portable reader.

In accordance with a specific aspect of the invention, the image acquisition cycle by the image reader is triggered automatically or manually by the operator when the measured distance is within the optimal range.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION

For purposes of explanation, specific embodiments are set forth to provide a thorough understanding of the present invention. However, it will be understood by one skilled in the art, from reading this disclosure, that the invention may be practiced without these specific details. Moreover, well-known elements, devices, process steps and the like are not set forth in detail in order to avoid obscuring the scope of the invention described.

The invention overcomes problems related to targeting a symbology when using portable imaging devices. The apparatus described provides a quick way of positioning the imaging device within an optimal range of distances from the target.

In accordance with the present invention, a range-finding system uses a distance-measuring device to determine the distance between a target, such as a label containing a bar code, and an image reading device. An operator receives a visual indication which will assist in positioning the image reading device within the optimal reading range of the target. The optimal reading range will vary depending on the application used. For example, a standard application typically requires a range of approximately 2 to 20 inches, while an Ultra-High Density (UHD) application typically requires a range of approximately 1 to 6 inches.

Figure 1:
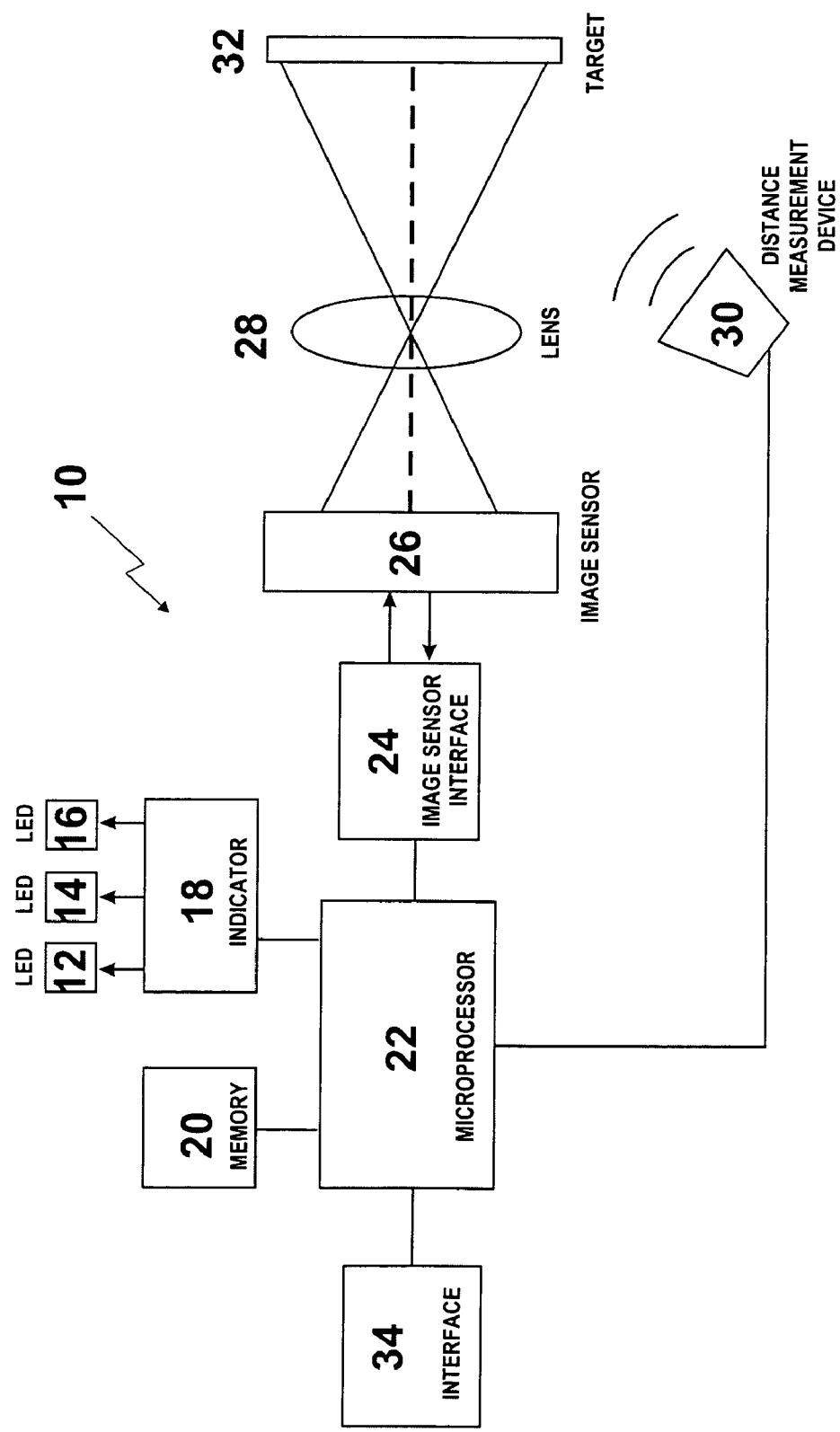
FIG. 1 is a block diagram representation of an embodiment of a range finding system for an image reader of the present invention.

As schematically illustrated in FIG. 1, a bar code portable image reader 10 basically comprises an objective lens 28 to direct the image of a target 32 onto an image sensor 26. The image sensor is coupled to a microprocessor 22 through an image sensor interface 24 for processing and identifying the image that is captured. In accordance with the present invention, the image reading device 10 further includes a range-finding system having a distance measurement device 30 such as an ultrasonic transducer and a memory 20 for storing look-up table values representing at least one range of optimal reading distances from a target 32. The microprocessor 22 compares the measured distance to the selected range of optimal reading distance values to determine whether the measured distance is within the optimal range, short of the optimal range or long of the optimal range. The range-finder further includes a visual indicator 18 controlled by the microprocessor 22 to provide an operator a visual signal indicating whether the reader is at a distance from the target within the optimal range, short of the optimal range or long of the optimal range.

The visual indicator 18 may include a series of LED's 12, 14, 16 each emitting a different wavelength of visible light. However, when the target 32 is aligned and within an optimal range from the portable image reader 10, a green LED 14 may be used to visually notify the operator that the portable image reader 10 is properly positioned in relation to a target. A yellow LED 12 may be used to indicate that the distance between the portable image reader 10 and the target 32 is long with respect to the selected range of optimal reading distance, and a red LED 16 may be used to indicate that the reader 10 distance is short with respect to the optimal reading distance and is too close to the target 32. When the symbol 32 is aligned and within the range of optimal reading distances from the device 10, that is to say when the green LED 14 is illuminated, the microprocessor is adapted to trigger the image acquisition cycle to capture an image of the target 32. In this particular embodiment, the microprocessor may be programmed to automatically trigger the image acquisition cycle when the target 32 is within the selected range of optimal reading distances.

Automatic bar code readers generally have a reduced incidence of motion induced blurring, also referred to as jitter, since the operator does not trigger the image capture mode and thus inadvertently move the portable image reader 10.

In a second embodiment of the present invention, a similar range-finding system may be used with a portable image reader 10 to manually control the triggering of the image acquisition cycle. In this particular embodiment, when the target 32 is within the optimal range, the LED 14 of a specific colour, such as green, would light up to signal that an image acquire can take place. This would prompt the human operator to trigger the image acquisition cycle in the processor 22 using an interface 34. If however, the portable image reader 10 is not within the optimal range of the target 32, an LED 12 of a different colour, such as yellow, would light up signaling to the human operator that the reader must be moved closer to the symbol or a third LED 16, such as a red LED, would light up to signal the operator to move the portable image reader 10 back to the optimal range. The microprocessor 22 may be programmed to permit the operator to trigger the image acquisition cycle at any time, or only when the portable image reader 10 is the optimal range of the target 32.

By using at least 3 different LED's 12, 14, 16 it is easier for the human operator to intuitively know which direction to move the portable image reader 10 in relation to the target 32. It should be understood by those skilled in the art that many different colours or combinations of colours of LED's, might be used without departing from the scope of the invention. Further, it should be noted that a single LED could also be used in a similar manner. For example, a constant light could indicate that the reader is in range, a slow flashing light could indicate that it is not yet in range, and a fast flashing light could indicate that the reader has passed the optimum range, or vice versa. Alternately, the LED may be made to blink at three different speeds that are easily identifiable. It should also be understood by those skilled in the art that other means of displaying visual information, such as laser diodes or other illumination sources, might be used without departing from the scope of the invention As indicated above, the distance measuring device 30 may be an ultrasonic transducer. In such a device 30, the ultrasonic transducer outputs an ultrasonic wave pulse that is reflected back from the target 32 as an echo. A minimum distance from the target 32 is required in order for a short time delay to occur from output of the ultrasonic wave to the reception of the echo pulse. The echo pulse detected is converted into a voltage which is received by an integrated controller within the transducer. The distance between the target 32 and the portable image reader 10 may then be determined by comparing the amplitude of the echo pulse to the amplitude of the original pulse since the amplitude of the ultrasonic wave decays rapidly with distance, or the distance may be determined by measuring the elapsed time between the transmission of the original pulse and the receipt of the echo pulse by the transducer.

Portable image readers 10 can normally decode an image of a target 32 even if the target 32 is not exactly a focal length away from the reader 32. For this reason, it is acceptable to acquire an image of a target 32 when it is anywhere in a range of optimal imaging distances from the portable image reader 10, each range will include a number of distance values. In a single application portable image reader 10, memory 20 will include values in a look-up-table (LUT) for only one range of optimal reading distances. This range of distance values will be compared to the measured distance to determine if the portable image reader 10 is in an acceptable position.

However, in a multiple application portable image reader 10, memory 20 includes distance values for a number of ranges of optimal imaging distances. When using the portable image reader 10, the operator specifies the field of view (FOV) or the desired range of optimal reading distances by entering the dimensions of the label to be targeted, or by choosing an option from a menu containing industry standard label dimensions (for example: standard or UHD), using the interface 34. Multiple ranges of optimal reading distances representing standard label dimensions would be stored in memory 20 and selected by the operator for the label type of interest. By having a large FOV, the portable image reader 10 is capable of decoding multiple bar codes within a targeted label.

Figure 2:
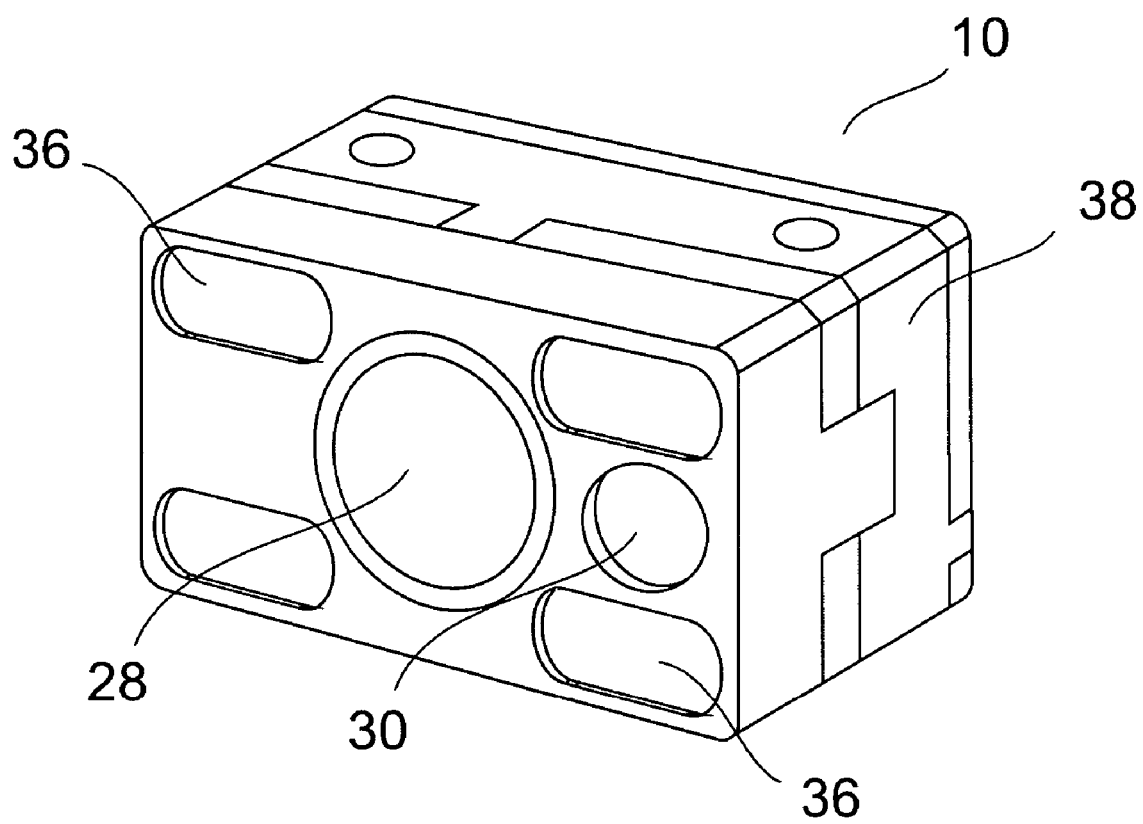
FIG. 2 is a front perspective view of the image engine with a distance measuring device in accordance with an embodiment of the present invention.

FIG. 2 illustrates the positioning of the ultrasonic transducer 30 within the housing of an image engine module 38 of the portable image reader 10. The module 38 comprises an objective lens 28, target illumination LED's 36 and the ultrasonic transducer 30 positioned at the front of the module 38 in close proximity to the objective lens 28.

Figure 3A:
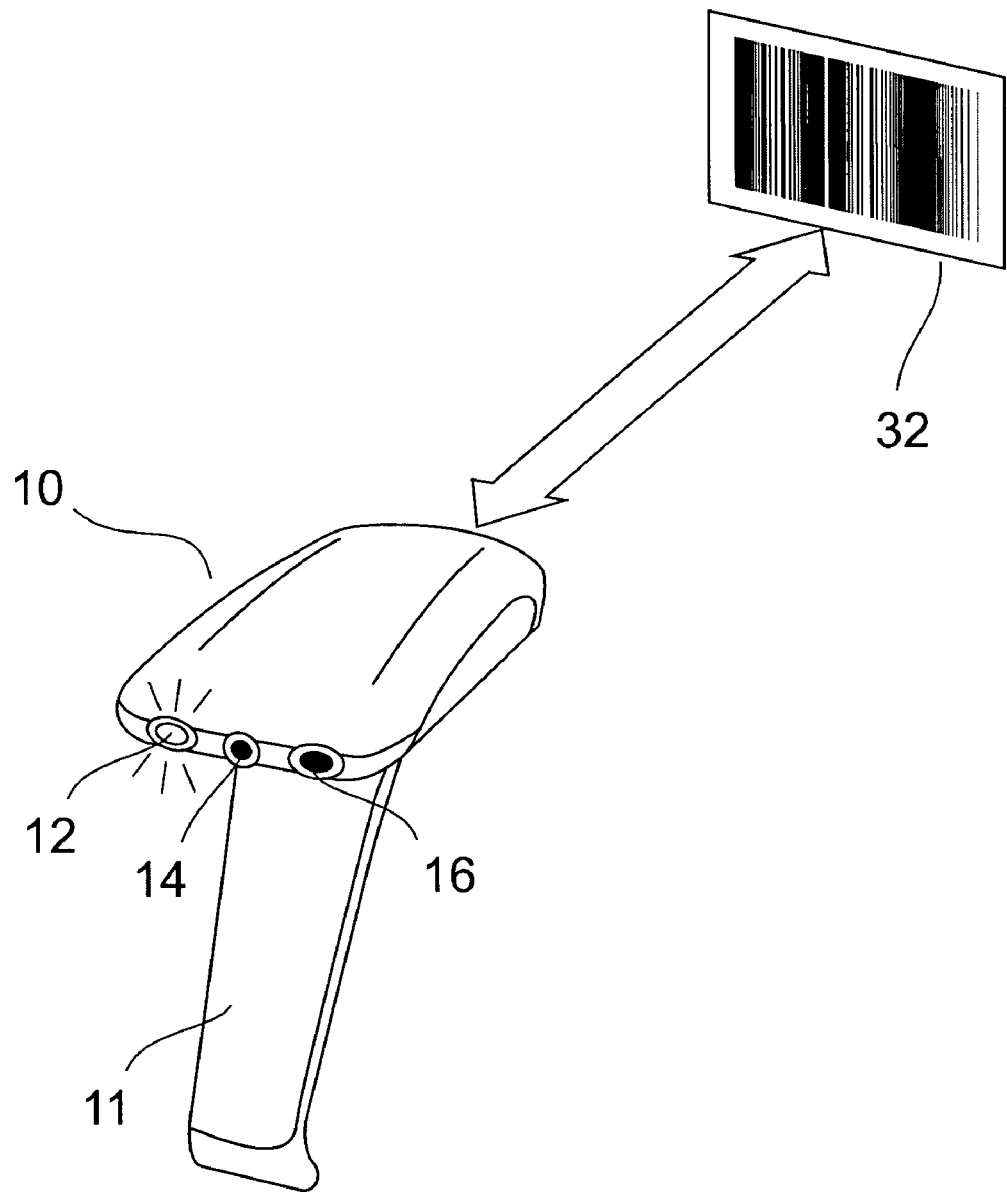
FIG. 3a is a top perspective view of the image reader and visual indicator of the present invention positioned too far from the target.
Figure 3B:
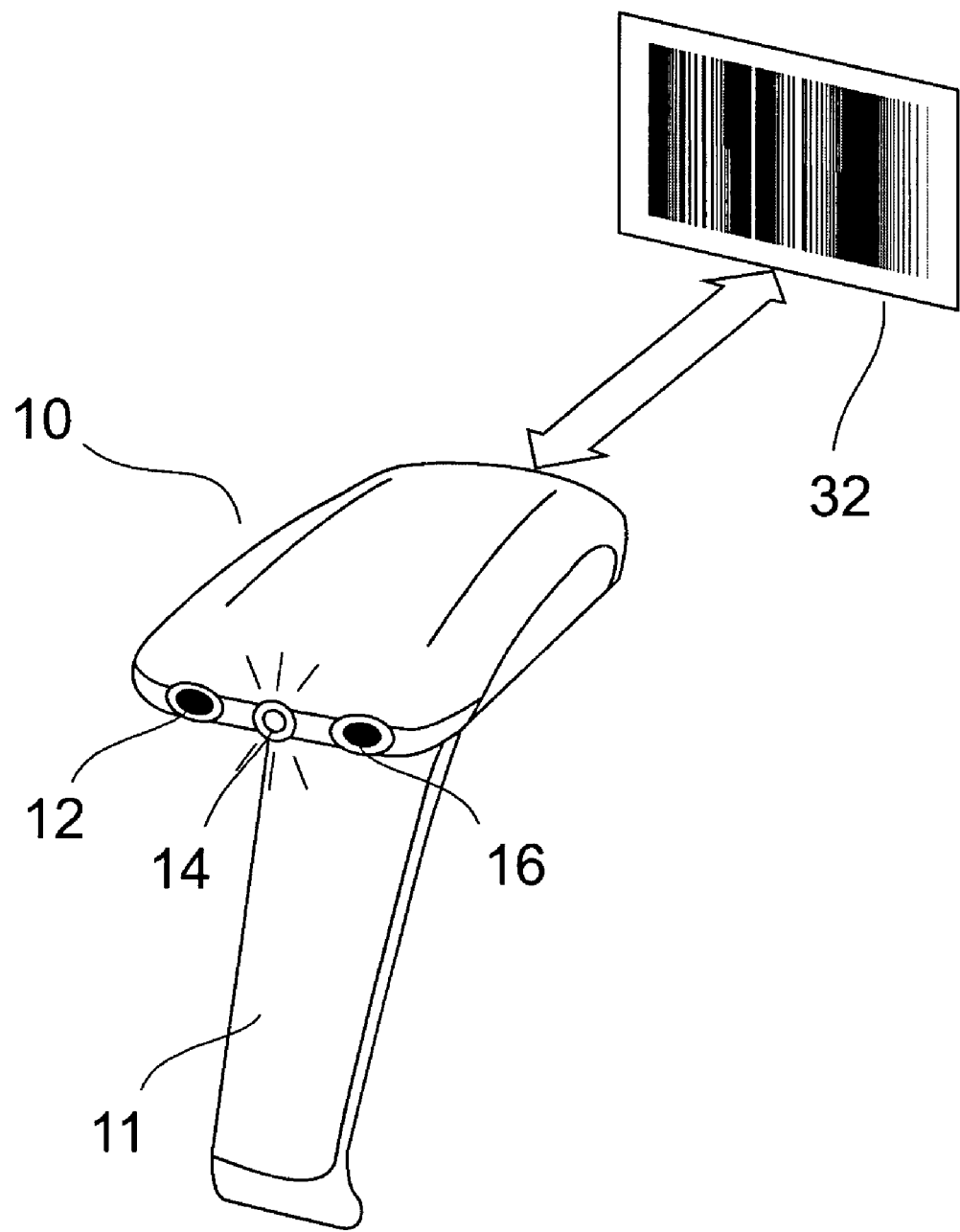
FIG. 3b is a top perspective view of the image reader and visual indicator of the present invention positioned at an optimal distance from the target.
Figure 3C:
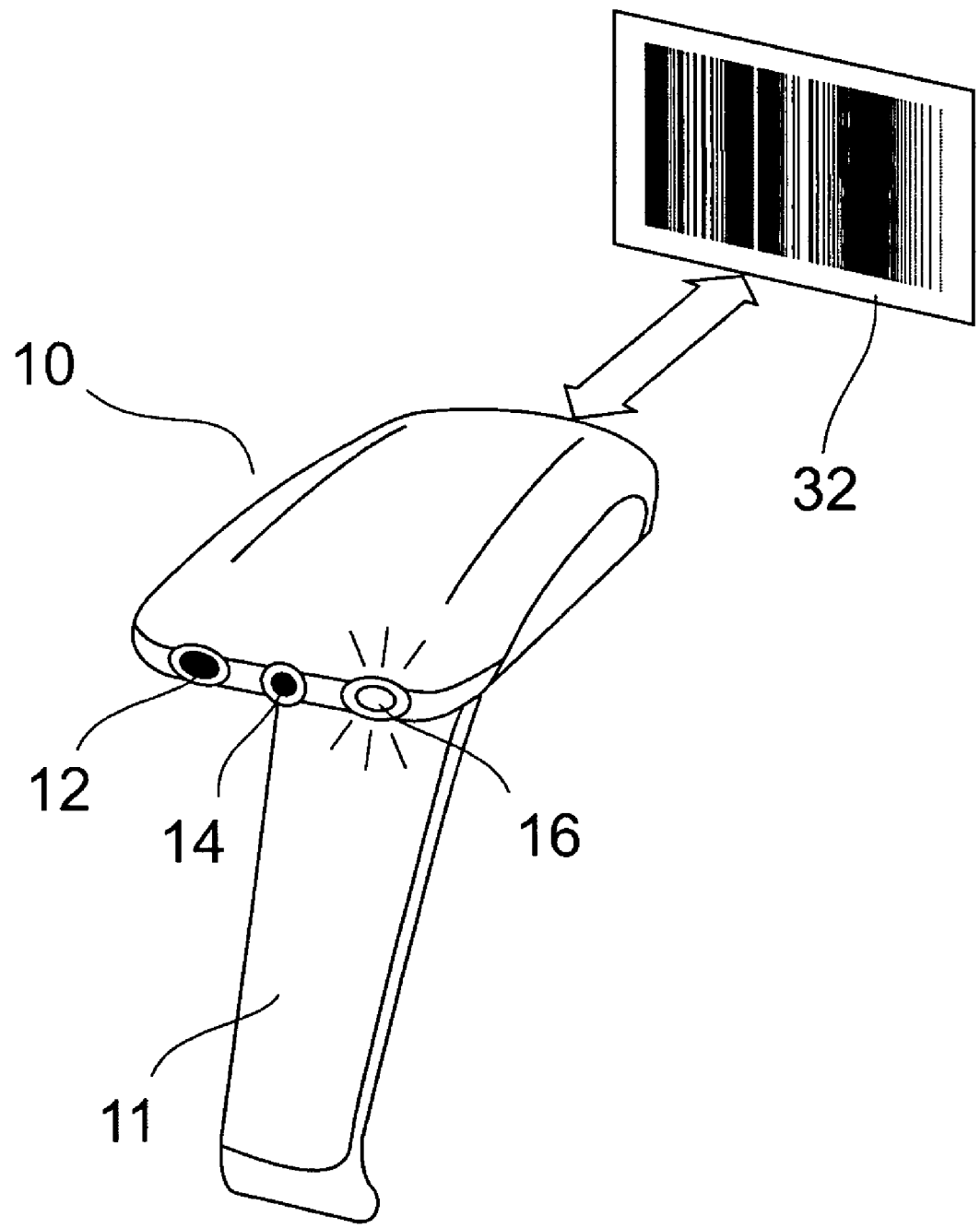
FIG. 3c is a top perspective view of the image reader and visual indicator of the present invention positioned too close to the target.

FIGS. 3A, 3B and 3C illustrate the portable image reader 10 with the visual notification LED's 12, 14, 16. The LED's 12, 14, 16 help guide the human operator to position the portable image reader 10 to within an optimal reading range from the target 32. The portable image reader 10 is shown with a handle 11 and visual notification LED's 12, 14, 16. While the visual notification LED's 12, 14, 16 in FIGS. 3A, 3B and 3C are located at the top rear section of the portable image reader 10 in a horizontal direction with relation to the human operator, it should be noted that any arrangement including, for example, an in-line vertical configuration anywhere on the portable image reader 10 that is visible to the human operator is also possible without departing from the scope of the invention.

Since the image reader in FIG. 3A is positioned too far from the target 32 and is out of the optimal reading range of the portable image reader 10, LED 12 is illuminated to provide visual notification to a human operator to move the portable image reader 10 closer to the target 32.

The portable image reader 10 of FIG. 3C is positioned too close to the target and is also out of the optimal reading range of the reader 10. LED 16 is illuminated to provide visual notification to a human operator to move the portable image reader 10 away from the target 32.

The portable image reader 10 of FIG. 3B is positioned in an optimal reading range from the target 32. LED 14 is illuminated to provide visual notification to a human operator that an image acquisition cycle has been triggered. Alternatively this visual notification prompts the human operator to trigger an image acquisition cycle using an interface 34 such as a switch or a trigger on the image reader handle 11.

Figure 4:
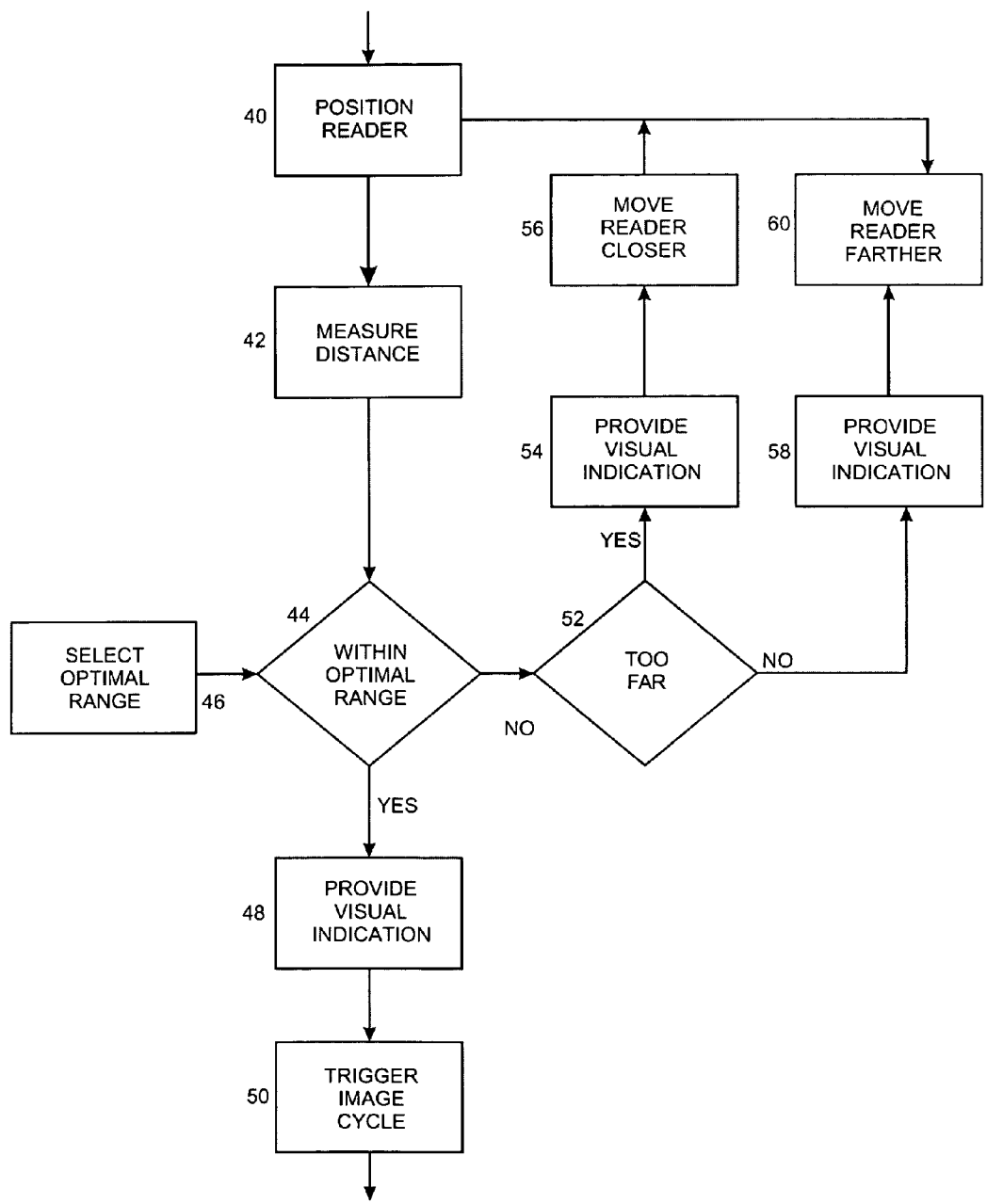
FIG. 4 illustrates the method of operating the portable image reader in accordance with the present invention.

The method of operating the portable image reader 10 as discussed with reference to FIGS. 3A to 3C is schematically illustrated in FIG. 4. The image reader is positioned 40 by an operator in front of a target 32, such a bar code. The distance to the target 32 is measured 42 and compared 44 to a selected 46 optimal range. If the measured distance is within the optimal range, a visual indicator 14 is illuminated 48, which causes the image acquisition cycle to be triggered 50 either automatically or by the operator. If the measured distance is not within the optimal range, it is determined 52 whether the reader 10 is too far from the target 32 or too close to the target. If the reader 10 is positioned too far from the target 32, a visual indicator 12 is illuminated 54, which prompts the operator to move 56 the reader closer to the target 32. If the reader 10 is positioned too close to the target 32, a visual indicator 16 is illuminated 58, which prompts the operator to move 60 the reader farther from the target 32. This process continues until the image acquisition cycle is triggered 50.

The present invention has the advantage that it provides a portable image reader with a visual notification system to intuitively guide the operator to align the reader to within a range of optimal reading distances from the target. Further, by having the reader automatically trigger the image acquisition cycle when the reader is in the optimal range, the amount of motion induced blurring caused by jitter is reduced. Also, a portable image reader in accordance with the present invention may be used for many applications by having the values for a range of optimal reading distances for each of the desired applications stored in memory for the operator to select.

While the invention has been described according to what is presently considered to be the most practical and preferred embodiments, it must be understood that the invention is not limited to the disclosed embodiments. Those ordinarily skilled in the art will understand that various modifications and equivalent structures and functions may be used without departing from the spirit and scope of the invention as defined in the claims. Therefore, the invention, as defined in the claims, must be accorded the broadest possible interpretation so as to encompass all such modifications and equivalent structures and functions.

What is claimed is:

1. A range-finding system for a portable image reader comprising:
    a distance-measuring device to measure the distance of the portable image reader from a target;
    a memory for storing values representing at least one optimal range of optimal reading distances from the target;
    a processor for comparing the measured distance to the range of optimal reading distance values in the memory to determine whether the measured distance is within the optimal range, short of the optimal range or long of the optimal range;
    a visual indicator coupled to the processor for providing an operator a visual signal indicating that the reader is at a distance from the target within the optimal range, short of the optimal range or long of the optimal range; and
    wherein the processor is adapted to trigger an image acquisition cycle by the image reader to capture an image of the target when the reader is at a distance from the target within the optimal range.

2. The range-finding system for a portable image reader as claimed in claim 1 wherein the processor automatically triggers the image acquisition cycle when the reader is at a distance from the target within the optimal range.

3. The range-finding system for a portable image reader as claimed in claim 1 comprising an interface coupled to the processor and operable by an operator to initiate the triggering of the image acquisition cycle.

4. The range-finding system for a portable image reader as claimed in claim 1 comprising an interface coupled to the processor and operable by an operator to initiate the triggering of the image acquisition cycle only when the reader is at a distance from the target within the optimal range.

5. The range-finding system for a portable image reader as claimed in claim 1 wherein the memory stores values representing a number of ranges of optimal reading distances from the target for a number of different applications for the image reader.

6. The range-finding system for a portable image reader as claimed in claim 5 comprising an interface coupled to the processor and operable by the operator to select a desired range from the ranges of optimal reading distances.

7. The range-finding system for a portable image reader as claimed in claim 1, wherein the distance measuring device comprises an ultrasonic transducer.

8. The range-finding system for a portable image reader as claimed in claim 1, wherein the visual indicator comprises three light sources, a first light source adapted to illuminate when the reader is at a distance from the target long of the optimal range, a second light source adapted to illuminate when the reader is at a distance from the target within the optimal range, and a third light source adapted to illuminate when the reader is at a distance from the target short of the optimal range.

9. The range-finding system for a portable image reader as claimed in claim 8 wherein each light source displays a different color light.

10. The range-finding system for a portable image reader as claimed in claim 8 wherein each light source blinks at a different rate.

11. The range-finding system for a portable image reader as claimed in claim 1, wherein the visual indicator comprises a light source, wherein the light source is adapted to blink at a first rate when the reader is at a distance from the target long of the optimal range, adapted to blink at a second rate when the reader is at a distance from the target within the optimal range, and adapted to blink at a third rate when the reader is at a distance from the target short of the optimal range.

12. The range-finding system for a portable image reader as claimed in claim 1, wherein the portable image reader is adapted to read a bar code symbol.

13. A method of operating a portable image-reader comprising the steps of:
    a. positioning the image reader before a target;
    b. measuring the distance of the portable image reader from the target;
    c. comparing the measured distance with an optimal range of reading distances from the target, including:
        determining whether the measured distance is within the optimal range,
        short of the optimal range or long of the optimal range,
    d. providing a first visual indication when the measured distance is within the optimal range;
    e. triggering an image acquisition cycle by the image reader when the measured distance is within the optimal range;
    f. providing a further visual indication when the measured distance is not within the optimal range, including:
        providing a second visual indication when the measured distance is long of the optimal range, and
        providing a third visual indication when the measured distance is short of the optimal range,
    g. moving the portable image reader towards a position within the optimal range; and
    h. repeating steps b. to g. until the image acquisition cycle by the image reader is triggered.

14. The method of operating a portable image-reader as claimed in claim 13 wherein step g. comprises:
    g.1. moving the portable image reader closer to the target when the second visual indication is provided; or
    g.2. moving the portable image reader away from the target when the third visual indication is provided.

15. The method of operating a portable image-reader as claimed in claim 13 wherein step c. comprises:

c.1. selecting the optimal range of reading distances from the target from a number of possible optimal ranges for the portable reader.

16. The method of operating a portable image-reader as claimed in claim 13 wherein step e. comprises:

e.1. automatically triggering the image acquisition cycle by the image reader when the measured distance is within the optimal range.

17. The method of operating a portable image-reader as claimed in claim 13 wherein step e. comprises:

e.1. manually triggering the image acquisition cycle by the image reader when the measured distance is within the optimal range.

\* \* \* \* \*